United States Patent [19]
Krull et al.

[11] Patent Number: 5,767,190
[45] Date of Patent: Jun. 16, 1998

[54] TERPOLYMERS OF ETHYLENE, THEIR PREPARATION AND THEIR USE AS ADDITIVES FOR MINERAL OIL DISTILLATES

[75] Inventors: Matthias Krull, Oberhausen; Werner Reimann, Frankfurt, both of Germany

[73] Assignee: Hoechst Aktiengesellschaft, Frankfurt, Germany

[21] Appl. No.: 841,006

[22] Filed: Feb. 22, 1997

[30] Foreign Application Priority Data

May 18, 1996 [DE] Germany ............... 196 20 118.7

[51] Int. Cl.$^6$ ............... C08L 23/06; C08L 23/08
[52] U.S. Cl. ............... 524/563; 525/222; 526/331
[58] Field of Search ............... 526/331, 348; 525/222; 524/563

[56] References Cited

FOREIGN PATENT DOCUMENTS

| | | |
|---|---|---|
| 0 099 646 | 2/1984 | European Pat. Off. . |
| 0 184 048 | 6/1986 | European Pat. Off. . |
| 203554 | 12/1986 | European Pat. Off. . |
| 0 203 554 | 1/1988 | European Pat. Off. . |
| 0 463 518 | 1/1992 | European Pat. Off. . |
| 463518 | 1/1992 | European Pat. Off. . |
| 0 493 769 | 7/1992 | European Pat. Off. . |
| 493769 | 7/1992 | European Pat. Off. . |

*Primary Examiner*—Jeffrey T. Smith
*Attorney, Agent, or Firm*—Bierman Muserlian & Lucas

[57] ABSTRACT

Terpolymers obtained by copolymerization of ethylene, the vinyl ester of one or more aliphatic monocarboxylic acids containing from 2 to 20 carbon atoms in the molecule and 4-methylpent-1-ene, a process for their preparation and their use as additives for mineral oils and mineral oil distillates.

20 Claims, No Drawings

TERPOLYMERS OF ETHYLENE, THEIR PREPARATION AND THEIR USE AS ADDITIVES FOR MINERAL OIL DISTILLATES

FIELD OF THE INVENTION

Terpolymers of ethylene, the vinyl ester of one or more aliphatic monocarboxylic acids of 2 to 20 carbon atoms in the molecule and 4-methylpent-1-ene having a melt viscosity measured at 140° C. of 20 to 10,000 mpa.s successfully used for improving the flowability of mineral oils and mineral oil distillates.

STATE OF THE ART

Crude oils and middle distillates obtained by distillation of crude oils, for example gas oil, diesel oil or heating oil, contain, depending on the origin of the crude oils, differing amounts of long-chain paraffins (waxes) in dissolved form. At low temperatures, these paraffins precipitate as platelet-shaped crystals, sometimes with inclusion of oil. This considerably impairs the flowability of the crude oils and the distillates obtained therefrom. Deposits of solids occur, and these frequently lead to problems in recovery, transport and use of the mineral oils and mineral oil products. Thus, at low ambient temperatures, e.g. during the cold time of year, blockages occur in the filters of, inter alia, diesel engines and furnaces. These blockages prevent reliable metering of the fuels and finally result in interruption of the fuel supply. The conveying of the mineral oils and mineral oil products through pipelines over relatively great distances can also be impaired, for example, in winter by precipitation of paraffin crystals.

It is known that undesired crystal growth can be suppressed by suitable additives and a rise in the viscosity of the oils can thus be counteracted. Such additives, which are known as pour-point depressants or flow improvers, change the size and shape of the wax crystals and thus counteract a rise in the viscosity of the oils.

The flow and cold behavior of mineral oils and mineral oil distillates is described by the pour-point (determined in accordance with ISO 3016) and the cold filter plugging point (CFPP; determined in accordance with EN 116). Both parameters are measured in °C.

Typical flow improvers for crude oils and middle distillates are copolymers of ethylene with carboxylic esters of vinyl alcohol. Thus, according to DE 11 47 799 B1, oil-soluble copolymers of ethylene and vinyl acetate having a molecular weight between about 1,000 and 3,000 are added to petroleum distillate fuels having a boiling range between about 120° and 400° C. Preference is given to copolymers comprising from about 60 to 99% by weight of ethylene and from about 1 to 40% by weight of vinyl acetate. They are particularly effective if they have been prepared by free-radical polymerization in an inert solvent at temperatures of from about 70° to 130° C. and pressures of from about 35 to 2,100 atm gauge pressure (DE 19 14 756 B2).

Other polymers used as flow improvers comprise, in addition to ethylene and vinyl acetate, for example 1-hexene (cf. EP 0 184 083 B1), diisobutylene (cf. EP 0 203 554 B1) or an isoolefin of the formula

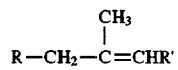

wherein R and R' are individually hydrogen or alkyl of 1 to 4 carbon atoms (EP 0 099 646 A1). Terpolymers of ethylene, vinyl acetate and vinyl neononanoate or vinyl neodecanoate as additives for mineral oil distillates are the subject matter of EP 0 493 769 B1. Copolymers of ethylene, alkenecarboxylic esters and/or vinyl esters and vinyl ketone are also used as pour-point depressants and for improving the flow behavior of crude oils and middle distillates of the crude oils (cf. EP 0 111 883 B1).

The effectiveness of the known additives for improving the properties of mineral oil fractions is dependent, inter alia, on the origin of the mineral oil from which they have been obtained and thus, in particular, on the composition of the latter. Therefore, additives which are very well suited to setting certain property values of fractions of one crude oil can therefore lead to completely unsatisfactory results in distillates of crude oils having a different origin.

Additives which have a wide range of application, i.e. significantly improve the low-temperature flow properties of mineral oils and mineral oil fractions of different origin, are now available. Nevertheless, there are cases in which they prove to be of little or no utility, either because they contribute only a little to increasing the flowability when cold or because they impair the filterability of mineral oil distillates above the cloud point. There are many reasons for this: the development of raw materials not previously used, the altered processing of the primary products and new market requirements may be mentioned as examples. In addition, the known flow improvers themselves have a high pour point. As a result of this property, at low ambient temperatures they have to be stored in heated tanks and/or be employed as highly diluted solutions.

OBJECTS OF THE INVENTION

It is an object of the invention to develop new additives for improving the flowability of those types of petroleum or petroleum fractions in which the additives of the prior art have only an unsatisfactory effect, which also ensure sufficient filterability of petroleum distillates above the cloud point and can also be handled without difficulty at low ambient temperatures.

It is another object of the invention to provide a process for the preparation of the novel terpolymers and to provide improved mineral oil or mineral oil distillates with good pour points.

These and other objects and advantages of the invention will become obvious from the following detailed description.

THE INVENTION

The novel terpolymers of the invention are a terpolymer of ethylene, the vinyl esters of at least one aliphatic, monocarboxylic acid of 2 to 20 carbon atoms in the molecule and 4-methylpent-1-ene, having a proportion of from 10 to 35% by weight of vinyl ester and from 0.5 to 20% by weight of 4-methylpent-1-ene (in each case based on the terpolymer) and a melt viscosity measured at 140° C. of from 20 to 10,000 mpa.s.

As regards the material composition of the new terpolymers, it should be noted that the vinyl esters of aliphatic monocarboxylic acids are counted in the invention as one monomer component, regardless of whether one or more vinyl esters of monocarboxylic acids of 2 to 20 carbon atoms are present in the terpolymers.

The invention also provides for the use of the above-described terpolymers for improving the flowability of mineral oils and, particularly, mineral oil distillates.

Surprisingly, the terpolymers of the invention have been found to be very useful for improving the flowability of mineral oils and mineral oil distillates including those whose flow behavior could be only insufficiently influenced using the additives of the prior art. A further valuable property of the new terpolymers is their low intrinsic pour point in organic solvents. It is significantly below the pour point of ethylene/vinyl ester copolymers. For this reason, the new terpolymers can be stored in unheated tanks, even at low outside temperatures, and can be used without prior warming. Particular mention should also be made of their significantly lower mixing-in temperature compared with comparable copolymers of the prior art, which leads to improved filterability of the middle distillates containing them above the cloud point.

In principle, the terpolymers can be used as flow improvers both in crude oils and in the downstream products of the crude oils obtained by distillation. However, they are preferably used in mineral oil distillates, in particular mineral oil middle distillates, viz. hydrocarbon fractions boiling between 150° and 400° C. Examples of such crude oil distillates are kerosine, light heating oils and diesel fuel. Of particular importance are middle distillates such as heating oil EL and diesel fuel.

The new terpolymers contain methyl groups which arise, on the one hand, from the structure of the comonomer molecules, particularly the 4-methylpent-1-ene, and on the other hand, from the polymerization mechanism of the ethylene. The terpolymers preferably have from 4 to 15 $CH_3$ groups per 100 $CH_2$ groups, excluding $CH_3$ groups which originate from the vinyl acetate as vinyl ester. The methyl groups are determined by $^1$H-NMR-spectroscopy.

Particularly suitable for use as flow improvers are terpolymers of the invention having a melt viscosity measured in accordance with ISO 3219(B) at 140° C. of 50 to 5,000 mpa.s, preferably 30 to 1,000 mpa.s and more preferably 50 to 500 mpa.s. Terpolymers of relatively high melt viscosity are preferably added to crude oils, those of relatively low melt viscosity are preferably added to middle distillates.

The preparation of the terpolymers of the invention from ethylene, vinyl ester of an aliphatic linear or branched monocarboxylic acid of 2 to 20 carbon atoms in the molecule and 4-methylpent-1-ene starts out from mixtures of the monomers. 4-methylpent-1-ene is a commercial product and the olefin is obtained industrially, for example by dimerization of propylene (cf. Ullmann's Encyclopedia of Industrial Chemistry, 5. Ed., Vol. A21., p. 567). The vinyl esters of the aliphatic monocarboxylic acids are likewise commercial products. A common way of preparing them is the reaction of carboxylic acids with acetylene (cf. Ullmanns Encyclopädie der Technischen Chemie, 4th edition, vol. 23, p. 598 ff). The acid component of the ester can be linear or branched.

Preference is given to vinyl esters of acetic acid, propionic acid, the isomeric butyric acids, lauric acid, neononanoic acid and neodecanoic acid, preferably vinyl acetate.

The copolymerization of the starting materials is carried out by known methods (see, for example, Ullmanns Encyclopädie der Technischen Chemie, 4th edition, vol. 19, pp. 169 to 178). Suitable methods are polymerization in solution, in suspension, in the gas phase and high-pressure bulk polymerization. Preference is given to using high-pressure bulk polymerization which is carried out at pressures of from 50 to 400 MPa, preferably from 100 to 300 MPa, and temperatures of 50° to 350° C., preferably 100° to 300° C.

The reaction of the monomers is initiated by initiators which form free radicals (free-radical chain initiators). This class of substances includes, for example, oxygen, hydroperoxides, peroxides and azo compounds such as cumene hydroperoxide, t-butyl hydroperoxide, dilauroyl peroxide, dibenzoyl peroxide, bis(2-ethylhexyl) peroxydicarbonate, t-butyl perpivalate, t-butyl permaleate, t-butyl perbenzoate, dicumyl peroxide, t-butyl cumyl peroxide, di-(t-butyl) peroxide, 2,2'-azobis(2-methylpropanonitrile), 2,2'-azobis(2-methylbutyronitrile). The initiators are used either individually or as a mixture of two or more substances in amounts of from 0.01 to 20% by weight, preferably from 0.05 to 10% by weight, based on the monomer mixture.

The desired melt viscosity of the terpolymers is, for a given composition of the monomer mixture, set by variation of the reaction parameters, pressure and temperature and, if desired, by addition of moderators. Moderators which have been found to be useful are hydrogen, saturated or unsaturated hydrocarbons, e.g. propane, aldehydes, e.g. propionaldehyde, n-butyraldehyde or iso-butyraldehyde, ketones, e.g. acetone, methyl ethyl ketone, methyl isobutyl ketone, cyclohexanone, or alcohols, e.g. butanol. Depending on the desired viscosity, the moderators are employed in amounts of up to 20% by weight, preferably from 0.05 to 10% by weight, based on the monomer mixture.

To obtain polymers of the composition claimed, use is made of monomer mixtures comprising, apart from ethylene and if desired a moderator, 5 to 40% by weight, preferably 10 to 40% by weight, of vinyl ester and from 1 to 40% by weight of 4-methylpent-1-ene.

The use of a composition of the monomer mixture differing from the composition of the terpolymer takes account of the different polymerization rates of the monomers. The polymers are obtained as colorless melts which solidify at room temperature to give wax-like solids.

The high-pressure bulk polymerization is carried out in known high-pressure reactors, e.g. autoclaves or tube reactors, batchwise or continuously and tube reactors have been found to be particularly useful. Solvents such as aliphatic hydrocarbons or hydrocarbon mixtures, benzene or toluene can be present in the reaction mixture, although the solvent-free procedure has been found to be particularly useful. According to a preferred embodiment of the polymerization, the mixture of the monomers, the initiator and, if used, the moderator is fed to a tube reactor both via the reactor inlet and via one or more side branches. Here, the monomer streams can have different compositions (EP 0 271 738 B1).

The terpolymers of the invention are added to mineral oils or mineral oil distillates in the form of solutions or dispersions. Suitable solvents or dispersion media are aliphatic and/or aromatic hydrocarbons or hydrocarbon mixtures, e.g. naphtha fractions, kerosine, decane, pentadecane, toluene, xylene, ethylbenzene or commercial solvent mixtures such as solvent naphtha, ®Shellsol AB, ®Solvesso 150, ®Solvesso 200, ®Solvesso 250, ®Exxsol, ®ISOPAR and Shellsol D grades. Mineral oils or mineral oil distillates which have had their Theological properties improved by the new polymeric compounds contain from 0.001 to 2% by weight, preferably from 0.005 to 0.5% by weight, of terpolymer, based on the distillate.

The terpolymers of the invention can also be used as flow improvers in the form of mixtures comprising polymers of the type claimed, but having a different qualitative and/or quantitative composition and/or a different viscosity (measured at 140° C.). Such mixtures comprise, for example, polymers having the same proportion of vinyl ester but a different proportion of ethylene/4-methylpent-1-ene. The mixing ratio (in parts by weight) of the two components can be varied over a wide range and can be, for example, from 20:1 to 1:20, preferably from 10:1 to 1:10. In this way, flow improvers can be matched to individual requirements in a targeted manner.

With the same result of optimizing the effectiveness as flow improvers for certain substrates, the polymers of the invention can also be used together with one or more oil-soluble co-additives which, even by themselves, improve the cold flow properties of crude oils, lubricating oils or fuel oils. Examples of such co-additives are vinyl acetate-containing copolymers or terpolymers of ethylene, polar compounds which effect dispersion of paraffins (paraffin dispersants) and comb-like polymers.

Thus, mixtures of the new terpolymers with copolymers comprising from 10 to 40% by weight of vinyl acetate and from 60 to 90% by weight of ethylene have been found to be very useful. According to a further embodiment of the invention, the terpolymers claimed are used in a mixture with ethylene-vinyl acetate-vinyl neononanoate terpolymers or ethylene-vinyl acetate-vinyl neodecanoate terpolymers to improve the flowability of mineral oils or mineral oil distillates. The terpolymers of vinyl neononanoate or vinyl neodecanoate comprise, apart from ethylene, from 10 to 35% by weight of vinyl acetate and from 1 to 25% by weight of the respective neo compound. The mixing ratio of the terpolymers of the invention with the above-described ethylene-vinyl acetate copolymers or the terpolymers of ethylene, vinyl acetate and the vinyl esters of neononanoic or neodecanoic acid is (in parts by weight) from 20:1 to 1:20, preferably from 10:1 to 1:10.

For use as flow improvers, the new terpolymers can also be used in admixture with paraffin dispersants which additives reduce the size of the paraffin crystals and have the effect of the paraffin particles not settling, but remaining colloidally dispersed with a significantly reduced sedimentation tendency. Paraffin dispersants which have been found to be useful are oil-soluble polar compounds containing ionic or polar groups, e.g. amine salts and/or amides which are obtained by reaction of aliphatic or aromatic amines, preferably long-chain aliphatic amines, with aliphatic or aromatic monocarboxylic, dicarboxylic, tricarboxylic or tetracarboxylic acids or their anhydrides (cf. U.S. Pat. No. 4,211,534). Other paraffin dispersants are copolymers of maleic anhydride and α,β-unsaturated compounds which can optionally be reacted with primary monoalkylamines and/or aliphatic alcohols (cf. EP 0 154 177), the reaction products of alkenylspirobislactones with amines (cf. EP 0 413 279 B1) and, according to EP 0 606 055 A2, reaction products of terpolymers based on α,β-unsaturated dicarboxylic anhydrides, α,β-unsaturated compounds and polyoxyalkylene ethers of lower unsaturated alcohols.

Finally, in a further preferred variant of the invention, the new terpolymers are used together with comb-like polymers as flow improvers. Comb-like polymers are polymers in which hydrocarbons of at least 8, preferably at least 10, carbon atoms are bound to a polymer backbone. They are preferably homopolymers whose alkyl side chains contain at least 8 and preferably at least 10 carbon atoms. In the case of copolymers, at least 20%, preferably at least 30%, of the monomers have side chains (cf. Comb-like polymers—Structure and Properties; N. A. Platé and V. P. Shibaev, J. Polym. Sci. Macromolecular Revs. 1974, Vol. 8, p. 177 ff). Examples of suitable comb-like polymers are fumarate-vinyl acetate copolymers (cf. EP 0 153 176 A1), copolymers of $C_6$–$C_{24}$-α-olefin and an N-$C_6$–$C_{22}$-alkylmaleimide (cf. EP 0 320 766), also esterified olefin/maleic anhydride copolymers, polymers and copolymers of α-olefins and esterified copolymers of styrene and maleic anhydride.

The mixing ratio (in parts by weight) of the terpolymers with paraffin dispersants or comb-like polymers is in each case from 1:10 to 20:1, preferably from 1:1 to 10:1.

The new terpolymers and their mixtures with one another and with co-additives can be used alone or together with other additives, for example with dewaxing auxiliaries, corrosion inhibitors, antioxidants, lubricity additives or sludge inhibitors.

In the following examples, there are described several preferred embodiments to illustrate the invention. However, it should be understood that the invention is not intended to be limited to the specific embodiments.

EXAMPLES

Preparation of Ethylene/Vinyl Carboxylate/4-methylpent-1-ene Terpolymers

Ethylene, vinyl acetate (Vina) and 4-methylpent-1-ene (4-MP) were polymerized with addition of propionaldehyde as a molecular weight regulator (moderator) in a continuously operated high-pressure autoclave. For this purpose, the monomer mixture to which bis(2-ethylhexyl) peroxydicarbonate dissolved in white spirit (15% strength by weight solution) had been added as initiator was fed into the reactor at the temperature given in Table 1a and at the reaction pressure likewise indicated in Table 1a. The residence time of the reactants in the autoclave was about 120 seconds. Table 1a shows starting materials and yields of Examples 1–11 and Table 1b shows the properties of the terpolymers obtained.

The vinyl acetate content was determined by pyrolysis of the polymer. For this purpose, 100 mg of the polymer together with 200 mg of pure polyethylene were thermally dissociated in a pyrolysis flask for 5 minutes at 450° C. in a closed system under reduced pressure and the dissociation gases were collected in a 250 ml round-bottom flask. The dissociation product, acetic acid, was reacted with an NaI/KIO$_3$ solution and the iodine liberated was titrated with Na$_2$S$_2$O$_3$ solution.

The content of 4-methylpent-1-ene and methyl groups in the polymers was determined by $^1$H-NMR spectroscopy (measurements in $C_2D_2Cl_4$ at 333K; spectrometer Am 360, Bruker). The viscosity was measured in accordance with ISO 3219 (B) at 140° C. with a rotation viscometer (Haake RV 20) using a cone-and-plate measuring system ($V_{140}$).

TABLE 1a

| Example No. | Temperature (°C.) | Pressure (MPa) | Feed (% by weight) $C_2H_4$ (%) | Vina (%) | 4-MP (%) | Initiator (ppm by weight) based on ethylene | Moderator (% by weight) based on monomers) | Yield (%) |
|---|---|---|---|---|---|---|---|---|
| 1 | 160 | 150 | 62 | 30 | 8 | 1,300 | 3.1 | 9.9 |
| 2 | 160 | 150 | 54 | 30 | 16 | 3,750 | 2.4 | 11.4 |
| 3 | 160 | 150 | 50.5 | 31 | 18.5 | 5,250 | 2.3 | 11.3 |
| 4 | 160 | 150 | 48 | 30 | 22 | 6,750 | 2.0 | 11.6 |
| 5 | 160 | 150 | 57 | 27 | 16 | 3,300 | 3.0 | 10.0 |
| 6 | 160 | 150 | 53 | 27 | 20 | 5,100 | 2.3 | 10.4 |
| 7 | 160 | 150 | 55 | 29 | 16 | 2,950 | 2.9 | 9.2 |
| 8 | 160 | 200 | 55 | 29 | 16 | 1,600 | 3.2 | 8.0 |
| 9 | 160 | 200 | 55 | 31 | 14 | 1,300 | 3.0 | 8.7 |
| 10 | 160 | 200 | 66 | 26 | 8 | 650 | 2.5 | 8.1 |
| 11 | 220 | 200 | 55 | 29 | 16 | 860 | 2.3 | 17.2 |

TABLE 1b

| Example No. | Vinyl Acetate content (% by weight) | $V_{140}$ (mPa.s) | $CH_3/100$ $CH_2$ |
|---|---|---|---|
| 1 | 28.5 | 147 | 4.5 |
| 2 | 27.5 | 154 | 7.1 |
| 3 | 28.8 | 132 | 8.0 |
| 4 | 28.3 | 109 | 9.1 |
| 5 | 25.3 | 88 | 7.4 |
| 6 | 24.3 | 108 | 8.5 |
| 7 | 26.8 | 111 | 7.4 |
| 8 | 26.2 | 113 | 6.6 |
| 9 | 29.7 | 125 | 6.3 |
| 10 | 22.6 | 284 | 4.2 |
| 11 | 26.4 | 122 | 7.4 |

The properties (handleability, effectiveness, solubility) of the new terpolymers were compared with the corresponding properties of a commercial ethylene-vinyl acetate copolymer (E-VA) having a vinyl acetate content of 28% by weight and a melt viscosity $V_{140}$ of 290 mPa.s and a similar commercial ethylene-vinyl acetate-diisobutylene terpolymer (E-VA-DIB) having a vinyl acetate content of 28% by weight, a melt viscosity $V_{140}$ of 275 mpa.s and 8 $CH_3$ groups per 100 $CH_2$ groups of the polyethylene.

Handleability of the Terpolymers

The measure used for the handleability of the polymers of the invention was their pour point measured in accordance with ISO 3016 on 50% strength by weight dispersions in kerosene (Kero) or 20% strength by weight solutions in solvent Naphtha (SN). The ratio of the studies are shown in Table 2.

TABLE 2

| | 20% in SN | 50% in Kero |
|---|---|---|
| Example 2 | −21° C. | −3° C. |
| Example 3 | −24° C. | −9° C. |
| Example 4 | −36° C. | −15° C. |
| Example 5 | −21° C. | −3° C. |
| Example 6 | −27° C. | 0° C. |
| Example 7 | −21° C. | −6° C. |
| Example 8 | −21° C. | −3° C. |
| Example 9 | −21° C. | −3° C. |
| Example 11 | −30° C. | −9° C. |

TABLE 2-continued

| | 20% in SN | 50% in Kero |
|---|---|---|
| E-VA | −9° C. | +18° C. |
| E-VA-DIB I | −15° C. | +6° C. |

Characterization of the Test Oils

The behavior of the new terpolymers as cold flow improvers for mineral oils was tested on the test oils 1 and 3 whose thermal properties are summarized in Table 3.

TABLE 3

| | Test oil 1 | Test oil 2 | Test oil 3 | Test oil 4 |
|---|---|---|---|---|
| Commencement of boiling | 187° C. | 185° C. | 184° C. | 165° C. |
| 30% | 248° C. | 261° C. | 271° C. | 256° C. |
| 90% | 330° C. | 359° C. | 329° C. | 354° C. |
| End of boiling | 358° C. | 380° C. | 353° C. | 370° C. |
| Cloud point | −7° C. | 2.9° C. | −5° C. | 0° C. |
| CFPP | −12° C. | 0° C. | −9° C. | −3° C. |

Effectiveness of the Terpolymers

Table 4 indicates the effectiveness of the ethylene-vinyl acetate-4-methylpent-1-ene terpolymers prepared as described in Examples 1 to 11 as additives for mineral oils and mineral oil distillates as measured by the CFPP test (cold filter plugging test in accordance with EN 116). The additives were used either as 50% strength suspensions in kerosene or as 20% strength solutions in solvent naphtha:

TABLE 4

| | Test oil 1 (+20% strength additive) | | | Test oil 2 (+50% strength additive | | | Test oil 3 (+50% strength additive) | | |
|---|---|---|---|---|---|---|---|---|---|
| Example | 300 ppm | 500 ppm | 1000 ppm | 100 ppm | 200 ppm | 400 ppm | 100 ppm | 200 ppm | 400 ppm |
| 1 | −20 | −20 | −24 | −11 | −15 | −14 | | | |
| 2 | −18 | −20 | −25 | | | | | | |
| 3 | −19 | −20 | −26 | | | | | | |
| 4 | −18 | −19 | −24 | | | | | | |

TABLE 4-continued

|  | Test oil 1 (+20% strength additive) | | | Test oil 2 (+50% strength additive) | | | Test oil 3 (+50% strength additive) | | |
|---|---|---|---|---|---|---|---|---|---|
| Example | 300 ppm | 500 ppm | 1000 ppm | 100 ppm | 200 ppm | 400 ppm | 100 ppm | 200 ppm | 400 ppm |
| 5 | −19 | −20 | −25 | −5 | −11 | −14 | | | |
| 6 | −18 | −18 | −24 | −2 | −10 | −11 | | | |
| 7 | −18 | −24 | −28 | | | | −4 | −14 | −18 |
| 8 | | | | | | | −6 | −16 | −19 |
| 9 | −18 | −21 | −25 | | | | −9 | −15 | −18 |
| 11 | | | | | | | −2 | −12 | −16 |
| E-VA copolymer | −19 | −20 | −20 | −9 | −11 | −14 | −2 | −12 | −15 |
| E-VA-DIB terpolymer | −18 | −19 | −18 | −2 | −11 | −16 | −4 | −9 | −12 |

Solubility of the Terpolymers

The solubility behavior of the terpolymers was determined in accordance with British Rail test as follows: 400 ppm of a dispersion of the polymer in kerosene (50% by weight of polymer, based on the dispersion) at 22° C. were added to 200 ml of the test oil 3 at 22° C. (see Table 3) and shaken vigorously for 30 seconds. After storage for 24 hours at +3° C., the oil was again shaken for 15 seconds and subsequently, at 3° C., filtered in three portions of 50 ml each through a 1.6 μm glass fiber microfilter (diam. 25 mm; Whatman GFA, Cat. No. 1820025). From the three filtration times $T_1$, $T_2$ and $T_3$, the ADT value was calculated as follows:

$$ADT = \frac{(T3 - T1)}{T2} \cdot 50$$

An ADT value of ≦15 is regarded as an indication that the gas oil was satisfactorily usable in "normal" cold weather. Products having ADT values of >25 are described as not filterable.

TABLE 5

|  | ADT |
|---|---|
| Blank (without additive) | 3.0 |
| Example 2 | 6.2 |
| Example 3 | 5.6 |
| Example 4 | 4.1 |
| Example 5 | 14.8 |
| Example 6 | 4.5 |
| Example 7 | 10.8 |
| Example 8 | 13.7 |
| Example 9 | 7.4 |
| Example 11 | 4.7 |
| E-VA | >25 |
| E-VA-DIB | >25 |

Various modifications of the compositions and products of the invention may be made without departing from the spirit or scope thereof and it should be understood that the invention is intended to be limited only as defined in the appended claims.

What we claim is:

1. A terpolymer of ethylene, the vinyl ester of at least one aliphatic, monocarboxylic acid of 2 to 20 carbon atoms in the molecule and 4-methylpent-1-ene, having a proportion of from 10 to 35% by weight of vinyl ester and from 0.5 to 20% by weight of 4-methylpent-1-ene (in each case based on the terpolymer) and a melt viscosity measured at 140° C. of from 20 to 10,000 mpa.s.

2. A terpolymer of claim 1 having 4 to 15 $CH_3$ groups per 100 $CH_2$ groups, excluding $CH_3$ groups which originate from vinyl acetate (as vinyl ester).

3. A process for preparing a terpolymer of claim 1 comprising polymerizing monomer mixtures comprising, apart from ethylene, from 5 to 40% by weight of vinyl ester of at least one aliphatic monocarboxylic acid of 2 to 20 carbon atoms in the molecule and from 1 to 40% by weight of 4-methylpent-1-ene (in each case based on the monomer mixture) and optionally a moderator, at pressures of from 50 to 400 MPa, and temperatures of from 50° to 350° C., in the presence of a free-radical chain initiator.

4. The process of claim 3, wherein the temperature is 100° to 300° C. and the pressure is 100 to 300 MPa.

5. The process of claim 3, wherein the moderator is an aliphatic aldehyde or an aliphatic ketone.

6. The process of claim 3, wherein the moderator is propionaldehyde or methyl ethyl ketone.

7. The process of claim 3, wherein the moderator is employed in an amount of from 0.05 to 10% by weight, based on the monomer mixture.

8. The process of claim 3, wherein the polymerization is carried out in the presence of from 0.01 to 20% by weight, based on the monomer mixture, of a free radical chain initiator.

9. A mixture comprising at least one terpolymer of claim 1 and ethylene-vinyl acetate copolymers in a weight ratio of from 20:1 to 1:20.

10. A mixture of claim 9, wherein the ethylene-vinyl acetate copolymers comprise from 60 to 90% by weight of ethylene and from 10 to 40% by weight of vinyl acetate.

11. A mixture comprising terpolymers of claim 1 and ethylene-vinyl acetate-vinyl neononanoate terpolymers or ethylene-vinyl acetate-vinyl neodecanoate in a weight ratio of from 20:1 to 1:20.

12. A mixture as claimed in claim 11, wherein the ethylene-vinyl acetate-vinyl neononanoate terpolymers or the ethylene-vinyl acetate-vinyl neodecanoate terpolymers comprise, apart from ethylene, from 10 to 35% by weight of vinyl acetate and from 1 to 25% by weight of vinyl neononanoate or vinyl neodecanoate.

13. A mixture comprising terpolymers of claim 1 and paraffin dispersants in a weight ratio of from 1:10 to 20:1.

14. A mixture comprising terpolymers of claim 1 and comb-like polymers in a weight ratio of from 1:10 to 20:1.

15. A mineral oil or mineral oil distillate containing 0.0005 to 1% by weight (based on the mineral oil distillate), of a terpolymer of claim 1.

16. A mineral oil or mineral oil distillate containing 0.0005 to 1% by weight of a mixture of claim 9.

17. A mineral oil or mineral oil distillate containing 0.0005 to 1% by weight of a mixture of claim 11.

18. A mineral oil or mineral oil distillate containing 0.0005 to 1% by weight of a mixture of claim 13.

19. A method of improving the pour point of a mineral oil or mineral oil distillate comprising incorporating into the mineral oil or mineral oil distillate 0.0005 to 1.0% by weight thereof of a terpolymer of claim 1.

20. A method of improving the pour point of a mineral oil or mineral oil distillate comprising incorporating into the mineral oil or mineral oil distillate 0.0005 to 1.0% by weight thereof of a terpolymer of claim 9.

* * * * *